United States Patent
Jelling et al.

(10) Patent No.: US 6,759,453 B2
(45) Date of Patent: Jul. 6, 2004

(54) ASPHALT COMPOSITIONS

(76) Inventors: Murray Jelling, 21 Spring Hill Rd., Roslyn Heights, NY (US) 11577; Richard F. Stockel, 475 Rolling Hills Rd., Bridgewater, NJ (US) 08807; James Henderson Collins, 5602 Grape Rd., Houston, TX (US) 77096; Mohamed Emam Labib, 650 Ewing St., Princeton, NJ (US) 08540

( * ) Notice: Subject to any disclaimer, the term of this patent is extended or adjusted under 35 U.S.C. 154(b) by 0 days.

(21) Appl. No.: 09/970,435

(22) Filed: Oct. 3, 2001

(65) Prior Publication Data

US 2002/0042477 A1 Apr. 11, 2002

Related U.S. Application Data

(60) Provisional application No. 60/238,574, filed on Oct. 6, 2000.

(51) Int. Cl.$^7$ ................................................ C08L 95/00
(52) U.S. Cl. ............................ 524/59; 524/69; 524/70; 524/71
(58) Field of Search ............................. 524/59, 69, 70, 524/71

(56) References Cited

U.S. PATENT DOCUMENTS

| 4,068,056 A | 1/1978 | Engel et al. |
| 4,068,057 A | 1/1978 | Engel et al. |
| 4,068,058 A | 1/1978 | Engel et al. |
| 5,262,486 A | * 11/1993 | Telser et al. ................. 525/243 |

FOREIGN PATENT DOCUMENTS

GB  1584504  * 2/1981

OTHER PUBLICATIONS

Jew, J. Appl. Polym. Sci. 31, 2683–2704 (1986).

* cited by examiner

*Primary Examiner*—Bernard Lipman

(57) ABSTRACT

The invention comprises polymers which have been functionalized so as to be able to chemically react with polyamines to form adducts containing at least one or more groups consisting of amino, amido, imino, imido, or imidazloyl. Furthermore, the invention teaches processes to prepare these adducts by solution, melt or in-situ methods. A further embodiment of the invention pertains to the use of polyolefin plastomers or elastomers, elastomeric polyethylene-polypropylene, compositions or interpolymers of styrene-α olefins, which have been chemically modified so that they react with polyamines to confer to asphalt significantly improved desired chemical and physical properties.

34 Claims, No Drawings

ASPHALT COMPOSITIONS

This application claims the benefit of provisional application 60/238,574 filed Oct. 6, 2000.

INTRODUCTION

Asphalt is used in a variety of applications, but by far the major use is in road construction and maintenance. Although it is a versatile material, the physical properties of asphalt may limit its usefulness in this and other applications. For quite a number of years researchers have demonstrated that the addition of certain polymers~3 to about 8 wt. % or more can enhance the properties of asphalt. These include:

Increased toughness and tenacity

Increased tack, elasticity and improved impact resistance

Resistance to deformation at low temperatures, and

Resistance to deformation at high temperatures.

While a number of thermoplastics can confer the above properties to asphalt to a surprisingly high degree, there remains a serious problem, which the polymer generally does not address. This involves the interfacial surface energy between the aggregate, about 95 wt. %, and the bitumen, about 5 wt. %. Usually, a polymer is added to the above asphalt composite from about 5 to 25 wt. % based on the bitumen. The aggregate is highly hydrophilic while most polymers tend to be very hydrophobic. The result is delamination of the materials, particularly during freeze-thaw cycles, high temperatures and the exposure to salt, oil, gasoline, water etc.

This invention will describe methods of circumventing this very serious problem. The methods will be economically viable based on the utility of inexpensive raw materials and high production rate processes. The disclosure is also versatile in that it can be used with most of the current polyolefins presently being used to modify asphalt.

Other benefits are also inherent with this invention, such as the ease of dispersing the polymers with the asphalt. This is a particularly difficult and costly problem for polyolefins, most times requiring special high energy mixing equipment. The added expense can negate using this technology due to budgetary problems confronted by many states.

BEHAVIOR OF POLYMER MODIFIED ASPHALT

At low temperatures asphalt can turn brittle and crack: at high temperatures, it can soften when under the weight of heavy trucks passing over it. A road may be 80–100° F. hotter than it is in winter; and for every 100° F. rise in temperature, asphalt is a million times softer. Though it never actually runs off the road, it does creep into ridges and ruts that make driving dangerous. An asphalt road would hold up better with more built-in sturdiness.

Polymers work by creating a kind of support matrix within the asphalt. A seminal paper by JEW et al (J. Appl. Polym. Sci, 31,2685–2704 (1986)) confirmed that 8 wt. % polyethylene in a bitumen mixture possessed:

Increased flexural strength

Increased flexural modulus

Increased elongation

Increased fracture energy

These investigators concluded that a polyethylene in hot-mix paving materials can extend service temperature range at both high and low temperatures, thereby simultaneously reducing both pavement distortion (rutting) and low temperature cracking so that pavement lifetimes can be more than doubled.

These investigators also suggest the use of Kraton G (tri-block polymer) to control the stability of the mixture, particle size and compatibility of the dispersed polyethylene phase. However, this approach is not economically feasible due to the high weight percent of the polymers used and the costs for processing the asphalt-polymer blend.

FIELD OF THE INVENTION

The invention relates to polymers, which have been functionalized so as to contain one or more functional groups selected from the group consisting of amino, imino, imido and imidazloyl groups as well as processes for preparing such functionalized polymers. The functionalized polymer, when mixed with bitumen and aggregate provides for an excellent paving composition with improved physical properties and enhanced anti-stripping properties.

Many commodity polymers upon modification using the technology of this invention can be utilized. These include plastomers and elastomers whose compositions consist of polyolefins, styrene-alpha olefins, and polydienes.

Specifically, modified polyethylene, polypropylene, polyethylene-polypropylene copolymers or terpolymers, styrene-ethylene interpolymers, chlorosulfonated polyethylene, or polyisoprene. These are the preferred modified polymers.

This invention teaches the reaction of polyamines or polyether amines with the before described preferred polymers as being high desired polymer asphalt modifiers. There are basically two chemical reactions in which this invention modifies the desired polymers with polyamines. These are classified as amidation and amination.

Amidation involves the reaction of a carboxylic acid or an anhydride—with a polyamine, while amination involves either a grafting of a polyamine to the polymer backbone or by reacting a polyamine with a carbonyl functionality in the polymer or with a tertiary or secondary carbon atom in the polymer macromolecule. U.S. Pat. Nos. 4,068,056; 4,068,057; and 4,068,058 describe amination of polyolefins.

This invention also teaches methods in preparing the modified polymers, and subsequent blending with the asphalt. The compositions of value as polymer asphalt modifiers can be prepared by chemical solution reactions, intensive mixing devices, or in-situ in the presence of hot asphalt. Obviously, where appropriate the in-situ process offers considerable costs advantage over the other methods. Nevertheless, extrusion, single or twin screw, is also an economical viable process. Chemical solution modified is not preferred due to the considerable costs associated with this procedure.

DETAILED DESCRIPTION OF THE INVENTION

The first embodiment of the invention relates to polymers, which have been functionalized so as to contain one or more functional groups selected from the group consisting of amino, amido, imino, imido and imidazloyl groups as well as processes for preparing such functionalized polymers. Typically, the polymer prior to functionalization will have a number average molecular weight of 5,000 to about 500,000.

Subsequent to functionalization, the functionalized polymer will have a nitrogen content of about 0.05 to about 4.50 wt. %, based on the weight of the functionalized polymer. Suitable polymers for functionalization include polyolefins, elastomers, thermoplastic elastomers, and styrene-alpha olefin interpolymers.

Typically, the polyolefin will be a homopolymer of a $C_2$–$C_8$ olefin, a copolymer of two or more $C_2$–$C_8$ olefins; a copolymer of one or more $C_2$–$C_8$ olefins and a polymerizable monomer or a graft copolymer of one or more $C_2$–$C_8$ olefins and a polymerizable monomer. Suitable $C_2$–$C_8$ olefins include ethylene; propylene; a mixture of ethylene and propylene; butylenes; isoprene; and butadiene. Preferably the homopolymer is a polyethylene or a polypropylene. Suitable polyethylenes include low-density polyethylene, high-density polyethylene, linear low-density polyethylene, linear high-density polyethylene and metallocene polyethylene. Suitable polypropylenes include isotactic, syndiotactic and/or atactic polypropylene.

Preferably, the copolymer of two or more $C_2$–$C_8$ olefins comprises an amorphous or elastomeric copolymer of ethylene and propylene wherein the molar ratio of ethylene to propylene is the range of about 0.2:1 to about 3:1.

In the case of the polymer being a copolymer of one or more $C_2$–$C_8$ olefins and a polymerizable monomer, a suitable copolymer comprises an ethylene-propylene-diene monomer terpolymer, wherein the diene monomer is selected from the group consisting of 1,4-hexadiene; dicyclopentadiene; and ethylidene norbornene.

Suitably, the polymerizable monomer is selected from the group consisting of styrene $C_3$–$C_{15}$ (meth) acrylates, vinyl acetates, vinyl carboxylic acids and vinyl carboxylic acid anhydrides. Preferably, the $C_2$–$C_8$ olefins are selected from the group consisting of ethylene, propylene, a mixture of ethylene and propylene, and butylenes, and the polymerizable monomer comprising styrene.

In the case of the polymer being a graft polymer, suitable graft polymers include polyethylene and maleic anhydride, polypropylene and maleic anhydride and an ethylene-propylene copolymer and maleic anhydride.

In the case of the polymer being a copolymer of two or more $C_2$–$C_8$ olefins suitable copolymers are those of ethylene or propylene and an alpha-olefin selected from the group consisting of 1-butene, 1-hexene, 1-octene and vinyl cyclohexane.

In the case of the polymer being an elastomer, the elastomer may be virgin or reclaimed crumb rubber. In the case of the polymer being a thermoplastic elastomer, suitable thermoplastic elastomers include a styrene-α-olefin block copolymer, a blend of polypropylene and ethylene propylene rubber, a blend of polypropylene and ethylene propylene diene monomer, a blend of polypropylene and a poly(α-olefin), a multi-block copolymer of polyethylene and a poly(α-olefin), a multi-block copolymer of polypropylene and a poly(α-olefin); and mixtures thereof.

Other commercial elastomeric polymers, which can be modified with the polyamines of this invention, are chlorosulfonated polyethylene and polyisoprene. Both the chloro and sulfonyl chloride functions will react with the polyamines to give a useful polymer asphalt modifier having improved physical and chemical properties.

The functionalized polymer is readily prepared by reacting the desired polymer with a polyamine or polyamine ether in the presence of an oxygen-containing gas, e.g., air, and/or a peroxide and/or a diazo initiator. Typically, the reaction is carried out at a temperature of about 140 to about 280 C, preferably in two steps: (a) oxidizing the polymer with the oxygen-containing gas and/or peroxide and/or diazo initiator; and (b) reacting the oxidized polymer resulting from step (1) with an amine or amine ether to produce the functionalized polymer. Typically, after oxidation, the oxidized polymer will have functionalities capable of reacting with amines, amine-ethers, and/or hydroxy amines.

Preferably the reaction is carried out by mixing the oxidized polymer and the amine or amine ether at an agitation rate of about 30 to about 150 rpm over a period of time of about 1 to about 4 hours. The mixing is desirably carried out using a device such as Braebender or Banbury mixer, a reactive extruder; and a Farrel continuous mixer. The reaction may be carried out in the absence of any diluent or in the presence of a diluent such as an aromatic hydrocarbon, a paraffinic hydrocarbon, a naphthenic hydrocarbon, asphalt or mixtures thereof.

Suitable peroxides include dicumyl peroxide, di-t-amyl peroxide, diisobutyral peroxide, diisopropyl peroxydicarbonate, t-amyl peroxypivalate, t-butyl peroxypivalate, t-amyl peroxy-2-ethyl-hexanate, t-butyl peroxy-2-ethyl-hexanate, t-butyl peroxyisobutyrate, t-butyl peroxyacetate and t-butyl peroxybenzoate. Suitable diazo initiators include 2,2'-azobis(2,4-dimethylvaleronitrile); 2,2'-azo(2-methylpropane)(2,4-di-methyl-4-methoxy-valeronitrile); 2,2'-azobis(isobutyronitrile); 2,2'-azo(2-methylpropane) (2,4-dimethylvaleronitrile); 2,2'-azo(2-methylbutyronitrile); 2,1-azo(2-methyl-propane) (1-cyano-cyclohexane) and 2,1-azo(2-methylbutane)(1-cyanocyclohexane).

In the case where the desired polymers of this invention have grafted or copolymerized maleic anhydride or acrylic acid, from about 0.05 to about 5.0 wt. %, the reaction with the polyamine or polyamine ether is straight forward resulting in either an imide, amide or imidazole linkage between the polymer and the polyamine.

It has been experimentally determined that this reaction is quite facile in either a high intensity mixer or an extruder.

As mentioned above, the reaction takes place in the presence of an amine or amine ether. Desirably, the amine will contain at least two primary amine groups, at least one secondary amine group and/or at least one primary amine group and one secondary amine group, e.g., a polyalkyleneamine containing primary, secondary and/or tertiary monoamine and/or diamines groups containing a total of about 2 to about 60 carbon atoms. Preferably, the polyalkyleneamine contains repeating alkylene groups containing about 2 to about 12 carbon atoms. Preferably, the polyalkyleneamine comprises a polyethyleneamine, e.g., diethylenetriamine, triethylenetetramine, tetraethylenepentamine, pentaethylenehexamine and higher homologs thereof, and mixtures of the foregoing polyethyleneamines having an average molecular weight of about 100 to about 4,000. Alternatively, the polyalkyleneamine may preferably be a polypropyleneamine, especially a polypropyleneamine having the general formula: $R_2N[(CH_2)_3N]_n(CH_2)_3NR_2$, wherein n is an integer having a value of 1 to 6 and R is hydrogen or methyl. Particularly preferred is a heavy polyamine comprising a complex mixture of linear, branched and cyclic polyethyleneamines wherein the structures of the principal components of the heavy polyamine contain 6 or more nitrogen atoms per molecule.

Typically, the amine ether will be a polyoxyalkyleneamine containing primary monoamine, diamine and/or triamine groups attached to the terminus of a polyether backbone and will have a number average molecular weight of about 89 to about 5,000. Preferably, the polyether backbone is based on propylene oxide, ethylene oxide or mixed propylene oxide/ethylene oxide, e.g., a polyether primary amine which is derived from a nonylphenolethoxylate and has an ethylene oxide number of about 1 to about 10 and an amine value of about 1.3 to about 2.6 meq/g.

The functionalized polymers of the invention are useful for admixture with asphalt and preferably also with one or more fillers. The resultant admixture is particularly useful for applications such as paving compositions as well as for roofing compositions. As is well known, asphalt is a naturally occurring or pyrolytically obtained substance of dark color consisting almost entirely of carbon and hydrogen, with very little oxygen, nitrogen or sulfur. Asphalt generally understood to embrace the materials commonly known as coal tar, pitch or bitumen, including petroleum derived bitumen and naturally occurring bitumen such as lake asphalt and Gilsonite.

Typically, the functionalized polymer is present in the admixture with the bitumen in the amount of about 0.5 to 5.0 wt. %, based on the weight of the mixture. Preferably, the mixture also will contain from about 70 to about 95 wt. % of a filler, based on the total weight of asphalt functionalized polymer; and filler. Suitable fillers include aggregate; inorganic fibers; organic fibers; clays; minerals; sand; and mixtures thereof. The mixture may also contain an extender oil, preferably in the amount of about 1 to about 40 wt. %, based on the weight of the asphalt. Typically, the asphalt functionalized polymer and filler are mixed together at a temperature of about 80 to about 200 C. The functionalized polymer may be mixed with the asphalt and optionally with a filler or the polymer may be functionalized, i.e. oxidize and reacted with the amine or amine ether in the presence of the asphalt and optionally in the presence of a filler.

A further embodiment of the invention relates to a thermoplastic elastomer comprising a modified copolymer of a styrene monomer and a polymerizable comonomer. Suitable styrene monomers include styrene, methylstyrene and isopropyl styrene. Suitable polymerizable comonomers include one or more $C_4$–$C_{12}$ dienes, one or more $C_2$–$C_8$ olefins, one or more $C_3$–$C_{15}$ (meth)acrylates, one or more vinyl carboxylic acids, one or more vinyl carboxylic acid anhydrides and mixtures thereof. Suitable dienes include butadiene, isoprene, chloroprene, 1–4-hexadiene, dicyclopentadiene and ethylidene norbornene. Preferable copolymers are styrene-butadiene-styrene block copolymers, styrene-isoprene-styrene block copolymers and styrene-ethylene-butadiene-styrene copolymers and the like.

The process for preparing the modified thermoplastic elastomers of the invention involves reacting a copolymer of a styrene monomer and a polymerizable comonomer with an amine or amine ether in the presence of a free radical agent, e.g., a peroxide or a diazo initiator. Suitable peroxides, include dicumyl peroxide, di-t-amyl peroxide, diisobutyral peroxide, diisopropyl peroxydicarbonate, t-amyl peroxypivalate, t-butyl peroxypivalate, t-amyl peroxy-2-ethyl-hexanate, t-butyl peroxy-2-ethyl-hexanate, t-butyl peroxyisobutyrate, t-butyl peroxyacetate and t-butyl peroxybenzoate. Suitable diazo initiators include 2–2'-azobis(2,4-dimethylvaleronitrile); 2,2'-azo(2-methylpropane)2,4-diemthyl-4-methoxy-valeronitrile); 2,2'-azobis (isobutyronitrile); 2,2'-azo(2-propane) (1-cyano-cyclohexane); and 2,1-azo(2-methylbutane)(1-cyanocyclohexane).

Typically, the reaction of the copolymer of a styrene monomer and a polymerizable comonomer with the amine or amine ether in the presence of the free radical agent is carried out at a temperature of about 140 to about 280 C. Preferably, the copolymer is reacted with an excess of the amine or amine ether such that the resultant aminated copolymer will have a nitrogen content of about 0.1 to about 5 wt. %, based on the weight of the modified copolymer. The amine or amine ether which is reacted with the copolymer may be an of those described above in respect to the preparation of the functionalized polymers of the invention.

Experimental
Polymers

The following polymers (not all inclusive) are suitable for amidation and/or amination according to the teachings of this invention. Preferably the polymers will be most efficacious as a polymer asphalt modifiers if they have a number average molecular weight of about 5,000 to about 500,000. These include any polyethylene, polypropylene, copolymer of ethylene and propylene (EP), EPDM (ethylene propylene diene monomers) or EPR (ethylene propylene rubber) that can be amidated and aminated.

Other preferred polymers include grafted or copolymerized polyethylene, polypropylene, EP, EPDM, EPR with maleic anhydride or acrylic acid followed by amidation. The amount of grafted or copolymerized maleic anhydride or acrylic acid should be from about 0.05 to about 8.0 wt. %.

Other preferred polymers, which can be modified according to this invention, are styrene-α-olefins where the olefin is most preferable ethylene.

Other polymers, which can be modified by polyamines or polyetheramines, are chlorosulfonated polyethylene (CSM) and polychloroprene. These polymers have reactive chlorine atoms, which can undergo nucleophilic substitution with amines in general.

Regarding all of the above described polymers, there should be incorporated from about 0.05 to about 4.50 wt. % nitrogen whose source is a polyamine or polyether amine.

The following list identifies commercial examples of polymers, which have worked using the teachings of our invention by reacting them with amines and/or ether amines.
1. Royal Tuf 490 (Uniroyal)
   EPDM grafted with about/wt. % maleic anhydride
2. Kraton FG 1901X—Shell
   SEBS grafted with maleic anhydride
3. Allied Signal Co.
   AC-307
   Oxidized polyethylene—oxidation number is 7 mg KOH/1 g polymer
4. Nucrel 0411HS—DuPont
   Polyethylene-c-methacrylic acid 11.0% methacrylic acid
5. Aldrich Chemicals
   Polyethylene grafted with about 0.85 weight percent maleic anhydride
6. Ricon Resins, Inc.
   Polybutadiene grafted with maleic anhydride
7. Polybend—Borealis
   Polypropylene grafted with maleic anhydride
8. Dow Plastics
   Blends of ethylene/styrene Interpolymer
9. Dylark 132—Arco Chemical Co.
   Polystyrene—maleic anhydride copolymer containing 6 wt. % anhydride
10. Hypalon 40 DuPont
    Chlorosulfonated Polyethylene
11. Exxelor VA 1801—EXXON Chemicals maleic anhydride functionalized elastomeric ethylene copolymer Polyamines and Polyether Amines
Specific polyamines include (not all inclusive) include the following examples:
1. Heavy polyamine—Union Carbide—A mixture of linear, branched, and cyclic ethyleneamines with the principal components containing six or more nitrogen atoms per molecule. Similar products are available from Dow Chemical, Akzo Nobel and Tosoh Corporation.

2. Bis-aminoethylpiperazine—Union Carbide
3. Amino (bis-aminohexyl)—DuPont
4. Aminoethylethanolamine—Union Carbide
5. Tetraethylenepentamine—Akzo Nobel
6. Triethylenetetramine—Tosoh Corporation
7. SC-62J—Morton Chemical—An ethoxylated polyethyleneamine
8. Polyethyleneamine—BASF
9. Jeffamine M-715—Huntsman Chemical Co.
An ethylene—propylene oxide with a terminal amine group
10. Jeffamine D-2000—Huntsman Chemical Co.
A diamine terminated polypropylene glycol
11. Jeffamine ED-900-Huntsman Chemical Co.
A polyether diamine based on predominately polyethylene oxide backbone.
12. Jeffamine EDR-192-Huntsman Chemical Co.
This is trioxyethylenediamine
13. Jeffamine T-3000-Huntsman Chemical Co.
This is the reaction of triols initiator reacted with propylene oxide, followed by amination of the terminal hydroxy group.

Processes to Prepare the Polymer Modified Asphalt of this Invention

There are three methods to prepare the compositions of this invention for use as polymer modified asphalt applications. The various amination and/or amidation reactions can be carried out by solution, intensive mixing and in-situ engineering processes.

Solution

Both amination and amidation can be carried out in high boiling solvents. The solvents used should not contain any reactive hydrogen atoms, which can be abstracted during the course of the chemical reaction. Hydrogen abstraction has the following descending order:
Phenolic>benzylic>allylic>tertiary hydrogen>secondary hydrogen>primary hydrogen.

It has been our experience that in order to perform the necessary chemical conversions in any process that tertiary hydrogens need to be present in the polymers to undergo amination and/or amidation. Of course, hydrogen abstractions having lower bond energy would be operable as well.

Therefore, in any given solution process to prepare the modified polymers of this invention it would be a prerequisite that the high boiling>150 C, preferably higher, solvent have only secondary or primary hydrogens e.g., mineral oil long chain hydrocarbons.

Intensive Mixing Devices

There are a number of intensive mixing devices which are commercially available. These type mixers can be either batch or continuous.

Internal batch mixers have been widely used in the production of polymer film, sheeting, dispersion and fluxing.

Essentially, internal mixers consist of cylindrical chambers of shells within which materials to be mixed are deformed by rotating blades or rotors. Frequently the blade is divided into two helices of opposite direction of pitch in order to further the shuffling of components within the mixture. Two specific types of intensive mixer are the well-known Banbury, Haake-Buchler Rheomix 600 and Braeblender types.

Continuous mixers (extruders) have many advantages for the purpose of carrying out the polymer modifications of this invention. The rates of production are many fold higher than a batch mixer. Rates as high as over 1,000 kg/hours are possible. Furthermore, no solvents are needed, or at least a bare minimum for dissolving the catalyst is needed.

Either a single or double screw extruder is an ideal mixer to practice this invention. The raw material is automatically fed from feed-hoppers into the first section of the rotor, which acts as a screw conveyor, propelling the material to the mixing section where it undergoes intensive shear between the rotors and the chamber wall, kneading between the rotors, and a rolling action.

Typical (not all-inclusive) extruders that are useful for this invention are made by Werner and Pfferderer (ZSK-30), and Berstorff (ECS-2E25). These are co rotating intermeshing twin-screw extruders. The screws of the extruder are assembled from individual screw elements. The different sections convey, melt, mix and knead.

When using continuous extruders the amidation process can be carried out sequentially which entails first an oxidation step, as previously described, followed by amidation if the oxidized group is a carboxylic acid. If the oxidation step forms a carbonyl group, then amination will occur. If the oxidation step forms a radical (lose of hydrogen atom leaving a radical carbon atom) then amination by the polyamine will be favored. Undoubtedly, in many cases we have investigated both amidation and amination occur in a competitive way depending on the particular polymer, polyamine, oxidant, temperature, time of reaction and other experimental factors.

In-Situ In Presence of Hot Asphalt

We have found that similar improvements in the physical and chemical properties of various asphalts can be accomplished by what we call the "in-situ" process. By adding the appropriate amount of polyamine and corresponding polymer to hot asphalt the resulting polymer modified asphalt has virtually the same properties as if the polymer additive was prepared first then added to hot asphalt.

The asphalt must be hot and fairly fluid with a temperature between 125 C to about 250 C. The reaction time various from about 1 hour to about 8 hours.

While it is true that asphalt contains functional acid and base sites, these are so minute that they do not deplete the effective concentrations of the polyamine and/or oxidized polymers. The overall effect is that a similar polymer modifier asphalt is formed when utilizing the "in-situ" process.

Advantages

The advantages of using the polymer-modified asphalt of this invention are the following:

Easily blended into asphalt

Low effective concentrations from about 1.5 to about 3.0 wt. %

Blended viscosity is only very slightly increased

Superior compatibility and storage stability

Superior aging whereby there is little change in viscosity over time

Increases the high temperature SHRP grade at concentrations between 1.5 to about 3.0 wt. %.

Our polymer modified additive can eliminate the use of an anti-stripping agent

Raw material and processing costs are minimized

DESCRIPTION OF TESTING PROCEDURES AND EXAMPLES

Bitumen is used in road paving, roofing, and industrial applications. It is an inexpensive material for these uses but has some inherent deficiencies. Temperature susceptibility is an area where bitumen can be improved. Many grades of asphalt lack sufficient stiffness (modulus) and elasticity at high service temperatures, which can lead to rutting of the road surface. At low temperatures they become brittle which can lead to cracking of the road structure. Polymers and other additives are commonly added to improve high temperature Theological properties hopefully without sacrificing low temperature performance. Thus, polymers can contribute to pavement performance when added to a relatively soft asphalt, which already has good low temperature characteristics. Another deficiency often encountered in hot mix asphalt is poor resistance to moisture damage. When exposed to moisture the adhesive bond between the asphalt binder and the aggregate can weaken causing premature pavement failure.

Advantageous features of the present invention include improved bitumen/polymer compatibility, improved rheological properties, and improved moisture resistance all of which contribute to improved pavement performance and durability.

Many asphalts are not compatible with high polymers. Such incompatible blends exhibit phase instability, which manifests itself in bulk phase separation such as, may occur in bulk storage at relatively high temperatures. Upon standing for long periods of time, a polymer rich (asphaltene lean) phase forms in the upper layers and a polymer lean (asphaltene rich) phase forms on the bottom for polymers with specific gravities less than about 1.0. Generally, in such asphalts one also observes a coarse dispersion of polymer, which leads to relatively poor rheological properties. Several problems then result. The polymer/asphalt dispersion requires constant agitation to maintain a relatively homogeneous mixture. Phase separation may also occur with time under service conditions encountered in field applications such as paving, roofing or other industrial uses. Also, in such cases, more polymer is often required to effect the desired improvements in physical properties thus adding significant cost.

It is therefore an objective of the present invention to provide compositions of bitumen and polymers, which are compatible and thus exhibit hot storage stability and improved viscoelastic properties. These compositions also show improved moisture resistance. In addition, low temperature properties have not been adversely affected. Excellent high temperature viscoelastic properties, as determined in a dynamic shear rheometer, include an increase in the complex modulus (G*) as well as decrease in the phase angle ($\delta$). In other words, both the viscosity or modulus and the elasticity of the polymer/bitumen blends are simultaneously improved.

In 1987 the Strategic Highway Research Program (SHRP) was initiated to develop tools to improve the performance and longevity of our national highway infrastructure. Test methods and specifications were developed, and have been adopted by the states and industry through the American Association of State Highway and Transportation Officials (AASHTO). These test methods and specifications were in the evaluation of polymer asphalt blends covered under the present invention. These include the Dynamic Shear Rheometer (DSR) for high temperature viscoelastic properties and the Bending Beam Rheometer (BBR) for low temperature properties. Compatibility or storage stability (gross phase separation) was carried out using the so-called "cigar tube aging test" described below.

The DSR measures the asphalt binder's resistance to permanent deformation, which can affect the rheology of the hot mix asphalt and therefore its resistance to rutting at elevated temperatures. According to SHRP, acceptable paving asphalt binders must possess a dynamic shear according to the formula G*/sin$\delta$ of greater than 1 kPA (on the original binder) at a given test temperature where the temperature of the road surface reaches that temperature. The temperature determined by the DSR test is the maximum pavement design temperature. For example, an asphalt binder which has a G*/sin$\delta$ of greater than 1 kPa at 70 C may be used in a hot mix asphalt which is applied to a road surface where the average seven day maximum pavement surface temperature never exceeds 70 C. This requirement may be increased when traffic loading is increased. So, for prevention of rutting and permanent deformation, higher values of G*/sin$\delta$ are very desirable. Obviously, the simultaneous increase in G* coupled with a decrease in d would be the most efficient and economical way to meet this requirement.

The BBR is a creep test carried out at low temperatures to determine the stiffness modulus and the ability of the asphalt binder to relax stresses. The important specification parameters are the Stiffness modulus (S) and the slope of the log log curve of S vs time, the so-called m value. According to SHRP at the given low temperature for pavement design an asphalt binder would be chosen which has an S of less than 300 MPa and and m value greater than 0.300. There is a temperature offset of 10 C between the test temperature and the pavement design temperature. In other words, if the pavement temperature is never expected to go below −28 C then the asphalt binder specification requires an S of less than 300 MPa and an m value of greater than 0.300 at −18 C. None of the polymer/bitumen binders that we tested showed a significant adverse affect on S or m.

Accordingly, SHRP asphalt binder specifications resulted in a scheme for Performance Grade (PG) asphalts using these test methods. As an example, a PG70,−28 asphalt binder would need to have a minimum original G*/sin$\delta$>1 KPa at 70 C and an S<300 MPa and m>0.300 at −18 C.

Compatibility or hot storage stability (gross phase separation) was evaluated using the static oven-aging test referred to as the "cigar tube test" specified at one time by the Utah Department of Transportation. A well-stirred sample of Polymer Modified Asphalt (PMA) is poured hot into an aluminum cigar tube (142 mm in length and 20 mm in diameter) and loosely capped with an aluminum cap. The tube is stored in a vertical position in a forced draft oven at 163 C for 24 hours. At the end of this aging period the tube is removed from the oven still in a vertical position and placed in a freezer for about 1 hour. The tube is removed from the freezer and cut with a tubing cutter into three equal pieces. The top and bottom pieces are placed in a small metal tin, which is placed in an oven. When the asphalt is melted, the cigar tube pieces are removed, the sample stirred and poured into molds for DSR testing. G*/sin$\delta$ is determined on the top and bottom samples from the cigar tube aging procedure. A Separation Index (SI) was determined by the following equation:

$$SI\ (\%\ Separation) = T - B \times 100(T+B)/2$$

where:
SI=Separation Index
T=G*/sin$\delta$ determined on the top third of the cigar tube
B=G*/sin$\delta$ determined on the bottom third of the cigar tube An SI of less than or equal to plus or minus 10% is considered acceptable. Higher values indicate less compatibility and greater gross phase separation. Large differences in the phase angle also indicate phase separation.

Moisture resistance was evaluated in one PMA using the Texas Boiling Test developed by the Texas Department of Transportation. Siliceous gravel from Eagle Lake, Tex. was coated with various hot PMAs and allowed to cool to room temperature. The coated aggregates are then exposed to boiling water for a specified time. If binder is stripped away, it floats to the surface of the water and can be recovered. After cooling to room the coated gravel is visually inspected and given a rating in terms of percentage of binder remaining adhered to the aggregate. In one example an amidated high density polyethylene blended with Wood River AC5 showed 100% coating vs the control unmodified Wood River AC5 having only 30% binder remaining adhered to the aggregate.

Results are given in the following examples by way of illustration of the invention:

Example 1

A 5% w PMA blend was made using DuPont's triamine functionalized Allied Signal's AC307 HDPE in Wood River AC5 (PG58,−22) asphalt. The resulting SI was 11.3%, the $G^*/\sin\delta$ was 1.1 KPa at 76 C and the phase angle was 70 degrees. The sample was smooth and creamy.

Example 2

A 2.5% w PMA blend was made using DuPont's BHMT functionalized Allied Signal AC307 HDPE in Wood River AC5 (PG58,−22) asphalt. The resulting SI was 7.6%, the $G^*/\sin\delta$ was 1.44 KPa at 70 C and the phase angle was 70 degrees. The sample was smooth and creamy.

Example 3

A 2% w PMA blend was made using a monoamine MNPA1000 functionalized Allied Signal AC307 HDPE in Wood River AC5 (PG58,−22) asphalt. The resulting SI was 7.3%, the $G^*/\sin\delta$ was 1.062 at 70 C and the phase angle was 76 degrees. The sample was smooth and creamy.

Example 4

A 2% w PMA blend was made using a Huntsman Jeffamine D2000 functionalized Allied Signal AC307 HDPE in Wood River AC5 (PG58,−22) asphalt. The resulting SI was 1.58%, the $G^*/\sin\delta$ was 1.155 at 70 C and the phase angle was 76 degrees. The sample was smooth and creamy.

Example 5

A 2% w PMA blend was made using a Huntsman Jeffamine D2000 functionalized Allied Signal AC307 HDPE in McCall AC30 (PG64,−22) asphalt. The resulting SI was 0.85%, the $G^*/\sin\delta$ was 1.781 at 70 C and the phase angle was 86 degrees. The sample was slightly grainy.

Example 6

A 2% w PMA blend was made using a Huntsman Jeffamine D4000 functionalized Allied Signal AC307 HDPE in McCall AC30 (PG64,−22) asphalt. The resulting SI was −6.4%, the $G^*/\sin\delta$ was 1.837 at 70 C and the phase angle was 84 degrees. The sample was slightly grainy.

Example 7

A 2% w PMA blend was made using an HPA functionalized Shell Kraton 1901X (maleated SEBS) in Wood River AC5 (PG58,−22) asphalt. The resulting SI was −1.7%, the $G^*/\sin\delta$ was 1.583 at 58 C and the phase angle was 83 degrees. The sample was smooth and creamy.

Example 8

A 2% w PMA blend was made using an HPA functionalized DuPont Nucrel ( ) in Wood River AC5 (PG58,−22) asphalt. The resulting SI was −6%, the $G^*/\sin\delta$ was 1.317 at 64 C and the phase angle was 83 degrees. The sample was smooth and creamy.

Example 9

A 2% w PMA blend was made using an HPA DuPont triamine functionalized Huntsman RT3585 EP copolymer in McCall AC30 (PG64,−22) asphalt. The resulting SI was 11.3%, the $G^*/\sin\delta$ was 1.113 at 70 C and the phase angle was 86 degrees. The sample was slightly grainy.

Example 10

A 5% w PMA blend was made using in situ HPA functionalization of Shell Kraton D1101 (SBS block copolymer) in Wood River AC5 (PG58,−22). The resulting SI was 0%. The sample was slightly grainy.

Example 11

A 2% w PMA blend was made using in situ HPA functionalized (using Varox DBPH) LDPE in McCall AC30 (PG64,−22) asphalt. The resulting SI was 0.4%, the $G^*/\sin\delta$ was 1.083 at 76 C and the phase angle was 85 degrees. The sample was grainy.

Example 12

A 3% w PMA blend was made using in situ addition of 0.004% w HPA to a blend of Exxon Exxelor VA-1803 (maleated EPR) in Frontier PG58,−28 asphalt. On addition of the HPA the blend immediately gelled indicating a strong coupling reaction.

Example 13

A 2.5% w PMA blend was made using HPA functionalized Aldrich PEI (600MW) in Wood River AC5 (PG58,−22) asphalt. The resulting SI was 8.10%, the $G^*/\sin\delta$ was 1.44 KPa at 70 C and the phase angle was 68 degrees. The sample was smooth and creamy.

Example 14

A 5% w PMA blend was made using HPA functionalized Allied Signal AC307 in Wood River AC5 (PG58,−22) asphalt. The resulting SI was 0%, the $G^*/\sin\delta$ was 1.84 Kpa at 76 C and the phase angle was 60 degrees. The sample was smooth and creamy.

Example 15

A 2% w PMA blend was made using solution amidated (with HPA) Allied Signal AC307 in McCall AC30 (PG64,−22) asphalt. The resulting SI was 6.48%, the $G^*/\sin\delta$ was 1.726 Kpa at 70 C and the phase angle was 82 degrees. The sample was smooth and creamy.

Example 16

A 2% w PMA blend was made using a melt amidated (with HPA) Allied Signal AC307 in McCall AC30 (PG64,−22) asphalt. The resulting SI was −3.6%, the $G^*/\sin\delta$ was 1.786 Kpa at 70 C and the phase angle was 82 degrees. The sample was smooth and creamy.

Example 17

A 2% w PMA blend was made using a dry blend of HPA and Allied Signal AC307 in McCall AC30 (PG64,−22)

asphalt. The resulting SI was 6.1%, the G*/sinδ was 1.879 Kpa at 70 C and the phase angle was 82 degrees. The sample was smooth and creamy.

Example 18

A 2% w PMA blend was made using in situ reacted HPA and Allied Signal AC307 in McCall AC30 (PG64,–22) asphalt. The resulting SI was 4.28%, the G*/sinδ was 2.292 at 70 C and the phase angle was 80 degrees. The sample was smooth and creamy.

What is claimed is:

1. A composition comprising a mixture of a bitumen and a polymer which has been functionalized so as to contain multiple nitrogen sites consisting of one or more amino, imino, imido, amido or imidazolyl groups.

2. The composition of claim 1 wherein the functionalized polymer is present in the amount of about 0.5 to about 5.0 wt. %, based on the weight of the composition.

3. The composition of claim 2 further comprising an extender oil.

4. The composition of claim 3 wherein the extender oil is present in the amount of about 1 to about 40 wt. % based on the weight of the bitumen.

5. The composition of claim 1 wherein the polymer prior to functionalization has a number average of at least about 5,000 to about 500,000.

6. The composition of claim 1 wherein the polymer prior to functionalization is selected from the group consisting of polyolefins, elastomers and thermoplastic elastomers.

7. The composition of claim 6 wherein the polyolefin is selected from the group consisting of a homopolymer of a $C_2$–$C_8$ olefin, a copolymer of two or more $C_2$–$C_8$ olefins, a copolymer of one or more $C_2$–$C_8$ olefins and a polymerizable monomer, and a graft copolymer of one or more $C_2$–$C_8$ olefins and a polymerizable monomer.

8. The composition of claim 5 wherein the $C_2$–$C_8$ olefin is selected from the group consisting of ethylene, propylene, a mixture of ethylene and propylene, butylenes, isoprene and butadiene.

9. The composition of claim 7 wherein the homopolymer comprises a polyethylene.

10. The composition of claim 9 wherein the polyethylene is selected from the group consisting of low density polyethylene, high density polyethylene, linear low density polyethylene, linear high density polyethylene and metallocene polyethylene.

11. The composition of claim 7 wherein the homopolymer comprises a polypropylene.

12. The composition of claim 11 wherein the polypropylene comprises an isotactic, syndiotactic and/or and atactic polypropylene.

13. The composition of claim 7 wherein the copolymer of two or more $C_2$–$C_8$ olefins comprises an amorphous or elastomeric copolymer of ethylene and propylene wherein the molar ratio of ethylene to propylene is in the range of about 0.2:1 to about 3:1.

14. The composition of claim 7 wherein the copolymer of one or more $C_2$–$C_8$ olefins and a polymerizable monomer comprises an ethylene-propylene-diene monomer terpolymer.

15. The composition of claim 14 wherein the polymerizable monomer is selected from the group consisting of styrene, $C_3$–$C_{15}$ (meth)acrylates, vinyl acetates, vinyl carboxylic acids and vinyl carboxylic acid anhydrides.

16. The composition of claim 7 wherein the $C_2$–$C_8$ olefin is selected from the group consisting of ethylene, propylene, a mixture of ethylene and propylene, and butylene, and the polymerizable monomer comprises styrene.

17. The composition of claim 7 wherein the graft copolymer is selected from the group consisting of polyethylene and maleic anhydride, polyethylene and ethyl vinyl acetate, polypropylene and maleic anhydride, and an ethylene-propylene copolymer and maleic anhydride.

18. The composition of claim 7 wherein the copolymer of two or more $C_2$–$C_8$ olefins comprises a copolymer of ethylene or propylene and an alpha-olefin selected from the group consisting of 1-butene, 1-hexane, 1-octene and vinyl cyclohexane.

19. The composition of claim 1 wherein the functionalized polyolefin has a nitrogen content of about 0.05 to about 4.5 wt. % based on the weight of the functionalized polyolefin.

20. The composition of claim 6 wherein the thermoplastic elastomer comprises a styrene-α-olefin block copolymer, a blend of polypropylene and ethylene-propylene rubber, a blend of polypropylene and ethylene propylene diene monomer, a blend of polypropylene and a poly (α-olefin), a multi-block copolymer of polyethylene and a poly (α-olefin), a multi-block copolymer of polypropylene and a poly (α-olefin) and mixtures thereof.

21. A process for preparing a composition comprising a mixture of bitumen and a functionalized polymer said polymer contains multiple nitrogen sites consisting of one or more amino, imino, imido, amido, or imidazolyl groups, which comprises reacting a polymer with an amino or amine ether in the presence of an oxygen containing gas and/or a peroxide and/or a diazo initiator to produce said polymer:

(a) in the absence of the bitumen and thereafter mixing the bitumen with the said polymer, or (b) in the presence of the bitumen.

22. The process of claim 21 wherein the polymer prior to functionalization has a number average molecular weight of about 5,000 to about 500,000.

23. The process of claim 21 wherein the oxidized polymer is reacted with an amine or amine ether such that the resultant functionalized polymer will have a nitrogen content of about 0.05 to about 4.50 wt. %, based on the weight of the functionalized polymer.

24. The process of claim 21 wherein the reaction is carried out at a temperature of about 140 to about 280° C.

25. The process of claim 21 wherein the reactions are carried out using a mixing device consisting of a Braebender mixer, a Banbury mixer, a reactive extruder and a Farrel continuous mixer.

26. The process of claim 21 further comprising mixing an extender oil with the bitumen and the functionalized polymer.

27. The process of claim 26 wherein the extruder oil is present in the amount of about 1 to about 40 wt. %, based on the weight of the bitumen.

28. The process of claim 21 wherein the polymer prior to functionalization is selected from the group consisting of polyolefins, elastomers and thermoplastic elastomers.

29. The process of claim 28 wherein the polyolefin is selected from the group consisting of a homopolymer of a $C_2$–$C_8$ olefin, a copolymer of two or more $C_2$–$C_8$ olefins, a copolymer of one or more $C_2$–$C_8$ olefins and a polymerizable monomer, and a graft copolymer of one or more $C_2$–$C_8$ olefins and a polymerizable monomer.

30. The process of claim 29 wherein the $C_2$–$C_8$ is selected from the group consisting of ethylene, propylene, a mixture of ethylene and propylene, butylene, isoprene and butadiene.

31. The process of claim 29 wherein the polymerizable monomer is selected from the group consisting of styrene, $C_3$–$C_{15}$ (meth)acrylates, vinyl acetates, vinyl carboxylic acids and vinyl carboxylic acid anhydrides.

32. The process of claim 21 wherein the amine comprises a polyalkyleneamine containing primary, secondary and/or tertiary monoamine and/or diamine groups containing a total of about 2 to about 60 carbon atoms.

33. The process of claim 21 wherein the polyethyleneamine is selected from the group consisting of diethylenetriamine, triethylenetetramine, tetraethylenepentamine, pentaethylenehexamine, and higher homologs thereof, and mixtures of the foregoing polyethyleneamines.

34. The process of claim 21 wherein the amine comprises a heavy polyamine comprising a complex mixture of linear, branched and cyclic polyethyleneamines wherein the structures of the principal components of the heavy polyamine contain 6 or more nitrogen atoms per molecule.

* * * * *